UNITED STATES PATENT OFFICE.

ROBERT H. HAMILTON AND WILLIAM GRIFFITH, OF PITTSBURG, PENNSYLVANIA, ASSIGNORS TO THEMSELVES AND CHRISTOPHER L. MAGEE AND WILLIAM A. MAGEE, OF SAME PLACE.

MANUFACTURE OF IRON.

SPECIFICATION forming part of Letters Patent No. 226,400, dated April 13, 1880.

Application filed December 13, 1879.

*To all whom it may concern:*

Be it known that we, ROBERT H. HAMILTON and WILLIAM GRIFFITH, of Pittsburg, in the county of Allegheny and State of Pennsylvania, have invented a new and useful Improvement in the Manufacture of Iron; and we do hereby declare the following to be a full, clear, and exact description thereof.

Our invention relates to a method of treating iron during the process of puddling, whereby it is more refined and rendered more tough and fibrous than by the ordinary methods of treating iron in a puddling-furnace.

The furnace which we employ in the practical operation of our process may be the ordinary reverberatory furnace used for puddling iron, although any description of reverberatory furnace adapted for boiling iron may be used.

The hearth of the furnace is covered with cinder and fixed in the ordinary way, the fire is started in the grate, and the furnace heated up as usual. The pig-iron is then charged into the hearth and the furnace fired up until the iron is completely melted. As soon as the iron is melted the furnace is stoppered up, the damper raised, and the fire agitated, so as to get up a strong heat, which is kept up until the iron has boiled from fifteen to thirty minutes. While the iron is still boiling, and before it begins to come to nature, we add to the charge of melted iron in the furnace a mixture or compound of black oxide of manganese, sal-soda, nitrate of soda, and muriate of ammonia. These ingredients, well mixed together in the proportions hereinafter stated, having been introduced into the hearth of the furnace, are thoroughly stirred into the mass of melted iron, and the process of puddling is then proceeded with in the usual way, excepting that it is unnecessary to introduce slag or cinder into the furnace at any time during the process of puddling, and also that the iron comes to nature and can be balled and removed from the hearth much sooner than by the ordinary process.

The effect of the introduction of the mixture of ingredients hereinbefore mentioned to the melted iron before it comes to nature is that the sulphur and other impurities in the iron and contaminations of the blast-furnace are carried off by the slag, so that a very superior quality of puddled iron is produced from an inferior grade of blast-furnace pig.

If desired, the mixture of ingredients may be added to the iron in the puddling-furnace as soon as the iron is melted and before boiling. We do not think, however, that this is the best method of using our invention, but prefer to boil the iron before introducing the physic.

We do not pretend to explain the theory on which our improvement is based, nor the chemical reactions which are produced; but we know by experience that the muck-bar obtained after squeezing or hammering and rolling the puddle-ball produced by our process, even when made from very ordinary pig metal, is extraordinarily fibrous and tenacious, much more so than the best qualities of iron treated in the ordinary way.

The proportions of the ingredients which we use may be varied somewhat without materially affecting the result; but we have found the following to be a very good mixture: For a charge of four hundred and fifty pounds of pig-iron we use, black oxide of manganese, one pound; sal-soda, three ounces; nitrate of soda, six ounces; muriate of ammonia, six ounces. These are to be thoroughly mixed before being used.

In place of the sal-soda, a double quantity, by weight, of muriate of soda may be used.

Although we prefer to make use of the mixture of muriate of ammonia with black oxide of manganese, sal-soda, and nitrate of soda, as before stated, yet we do not wish to confine our invention to the use of such mixture, as we have discovered that the muriate of ammonia may be used alone and without the other ingredients with very beneficial results on the iron, although the result is not as satisfactory as when the manganese, sal-soda, and nitrate of soda are added.

If the muriate of ammonia is used alone, the quantity should be about double that before stated.

Having thus described our improvement in the treatment of iron in the puddling process, what we claim as our invention, and desire to secure by Letters Patent, is—

1. The process herein described of refining and purifying iron, which consists in introducing into and mixing with the molten metal in the hearth of the furnace, and before the same has come to nature, muriate of ammonia in about the proportions and substantially as specified.

2. The method herein described of facilitating the refining process and bringing the iron to nature more quickly, which consists in combining with the muriate of ammonia with which the molten metal is treated the black oxide of manganese, sal-soda, or common salt, and nitrate of soda, substantially in the proportions and for the purpose specified.

In testimony whereof we, the said ROBERT H. HAMILTON and WILLIAM GRIFFITH, have hereunto set our hands.

ROBERT H. HAMILTON.
WILLIAM GRIFFITH.

Witnesses:
JAMES H. PORTE,
JAMES K. BAKEWELL.